(12) United States Patent
Burry et al.

(10) Patent No.: US 9,082,037 B2
(45) Date of Patent: Jul. 14, 2015

(54) METHOD AND SYSTEM FOR AUTOMATICALLY DETERMINING THE ISSUING STATE OF A LICENSE PLATE

(71) Applicant: Xerox Corporation, Norwalk, CT (US)

(72) Inventors: Aaron Michael Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 153 days.

(21) Appl. No.: 13/899,742

(22) Filed: May 22, 2013

(65) Prior Publication Data

US 2014/0348392 A1 Nov. 27, 2014

(51) Int. Cl.
*G06K 9/00* (2006.01)
*G06K 9/32* (2006.01)

(52) U.S. Cl.
CPC ............ *G06K 9/325* (2013.01); *G06K 2209/15* (2013.01)

(58) Field of Classification Search
CPC .............. G06K 9/00771; G06K 9/325; G06K 2209/15; G08G 1/0175
See application file for complete search history.

(56) References Cited

U.S. PATENT DOCUMENTS

| | | | |
|---|---|---|---|
| 5,081,685 A | 1/1992 | Jones, III et al. | |
| 5,651,075 A | 7/1997 | Frazier et al. | |
| 7,124,006 B2 | 10/2006 | Davidson et al. | |
| 7,171,061 B2 * | 1/2007 | Sarkar et al. | 382/309 |
| 7,676,392 B2 | 3/2010 | Hedley et al. | |
| 7,813,581 B1 | 10/2010 | Fitzpatrick et al. | |
| 8,218,822 B2 * | 7/2012 | Sefton | 382/105 |
| 8,265,988 B2 | 9/2012 | Hedley et al. | |
| 8,331,674 B2 | 12/2012 | Feris et al. | |
| 2006/0062492 A1 * | 3/2006 | Masuichi et al. | 382/305 |
| 2012/0215595 A1 | 8/2012 | Johnson et al. | |
| 2012/0258731 A1 | 10/2012 | Smith et al. | |
| 2012/0323770 A1 | 12/2012 | Michael | |
| 2013/0004024 A1 | 1/2013 | Challa | |

OTHER PUBLICATIONS

Paul et al., "Application of the SNoW machine learning paradigm to a set of transportation imaging problems", Jan. 2012, Proc. SPIE 8305, Visual Information Processing and Communication III, 830512-1-830512-11.*
Hamey et al., "Automatic Number Plate Recognition for Australian Conditions", Digital Image Computing: Techniques and Applications, 2005. DICTA '05. Proceedings 2005.*
Du et al., "Automatic License Plate Recognition (ALPR): A State-of-the-Art Review", Circuits and Systems for Video Technology, IEEE Transactions on, vol. 23, Iss:2, Feb. 2013, 311-325.*
Jiao et al., "A configurable method for multi-style license plate recognition", 2009, Pattern Recognition, vol. 42, Iss:3, 358-369.*
Kulkarni et al., "Automatic Number Plate Recognition (ANPR) System for Indian conditions", Radioelektronika, 2009. Radioelektronika '09. 19th International Conference, 111-114.*
Thome et al., "A cognitive and video-based approach for multinational License Plate Recognition", Machine Vision and Applications (2011) 22:389-407.*

* cited by examiner

*Primary Examiner* — Katrina Fujita
(74) *Attorney, Agent, or Firm* — Kevin Soules; Kermit D. Lopez; Luis M. Ortiz

(57) ABSTRACT

Methods and systems for automatically determining the issuing state of a license plate. An image of a license plate acquired by an ALPR engine can be processed via one or more OCR engines such that each OCR engine among the OCR engines is tuned to a particular state. Confidence data output from the OCR engine(s) can be analyzed (among other factors) to estimate the issuing state associated with the license plate. Multiple observations related to the issuing state can be merged to derive an overall conclusion and assign an associated confidence value with respect to the confidence data and determine a likely issuing state associated with the license plate.

20 Claims, 10 Drawing Sheets

METHOD AND SYSTEM FOR AUTOMATICALLY DETERMINING THE ISSUING STATE OF A LICENSE PLATE

FIELD OF THE INVENTION

Embodiments are generally related to image-processing methods and systems. Embodiments are further related to video-based surveillance methods and systems. Embodiments are additionally related to the field of ALPR (Automatic License Plate Recognition).

BACKGROUND

ALPR systems generally include various image processing and computer vision techniques for: (1) locating a license plate within a scene, (2) segmenting characters on the plate, and (3) performing optical character recognition to determine the character sequence.

One of the key steps in ALPR processing is identifying the issuing state of a license plate. Existing methods for estimating the issuing state from a captured plate image focus on identifying or measuring a number of key features on the plate, the presence or absence of logos, character spacing, character aspect ratio, color content in various locations on the plate, etc. The ability to accurately determine the issuing state for a license plate, however, continues to be a challenging aspect in the successful development and implementation of robust and efficient multi-state ALPR solutions.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide for an improved automatic license plate recognition engine.

It is another aspect of the disclosed embodiments to provide for methods and systems for automatically determining the issuing state of a license plate.

The aforementioned aspects and other objectives and advantages can now be achieved as described herein. Methods and systems are disclosed for automatically determining the issuing state of a license plate. In general, an image of a license plate acquired by an ALPR engine can be processed via one or more OCR engines such that each OCR engine is tuned to a particular state. Confidence data output from the OCR engine(s) can be analyzed (among other factors) to estimate the issuing state associated with the license plate. Multiple observations related to the issuing state can be merged to derive an overall conclusion and assign an associated confidence value with respect to the confidence data and determine a likely issuing state associated with the license plate.

The disclosed embodiments thus provide for a method and system of estimating the issuing state based on running multiple OCR engines, each tuned to a particular state, and analyzing the resultant confidences. Such embodiments can also use a Bayesian-based approach for merging multiple observations related to the issuing state (e.g., intermediate "guesses") to draw an overall conclusion and assign an associated confidence value.

The disclosed embodiments and solutions address the fact that the font of license plate characters can change substantially from one state to another. In fact, many states have their own specially designed font. As such, ALPR systems are typically designed to be robust against a predetermined set of state fonts (e.g., the New York font and the immediate surrounding states: PA, NJ, CT). The disclosed embodiments leverage intermediate knowledge gained within the OCR step to provide an estimate of the likely issuing state. Using a Bayesian approach, this information can then be combined with the state estimate obtained based on the syntax (e.g., layout and sequence of the characters on the plate) to determine an overall conclusion as to the issuing state. Thus, the disclosed embodiments provide an efficient approach for significantly improving the state identification accuracy, and therefore overall enhanced ALPR system performance without requiring any image content outside of the plate characters themselves.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Automatic License Plate Recognition (ALPR) systems are generally composed of cameras, illuminators, and vehicle triggers, which work together to capture images of vehicles and license plates. ALPR systems also include image processing and computer vision systems which perform processing which: (1) locates the license plate in a scene, (2) segments the characters within the license plate, and (3) performs optical character recognition (OCR) to determine the character sequence on the license plate. In addition, the State jurisdiction, the plate type, and other information are often required to be determined. ALPR systems are used extensively in transportation systems such as electronic tolling systems and photo enforcement systems (speed enforcement or red light enforcement) where vehicle identity is required.

The performance requirements for ALPR systems are ever increasing. ALPR mistakes can lead to unidentified vehicles causing lost tolling revenue, for example, or worse can lead to erroneous violations which cause frustration with transportation system patrons who need to go through a process to have the violation vacated. Requirements of 99.5% accuracy and beyond are typically required for current request for proposals put out by transportation agencies.

Figure 1:
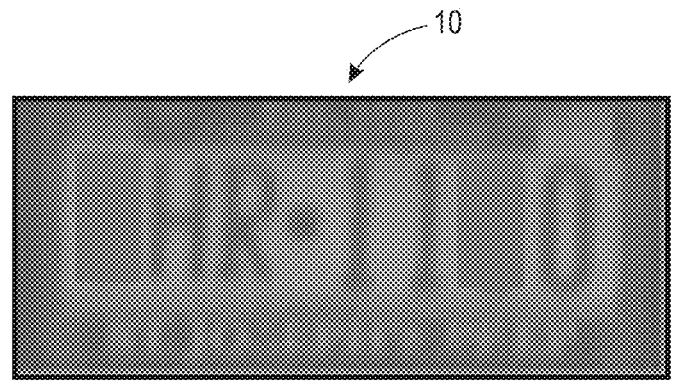
FIG. 1 illustrates a sample tolling image with dominant license plate frame.
Figure 2:
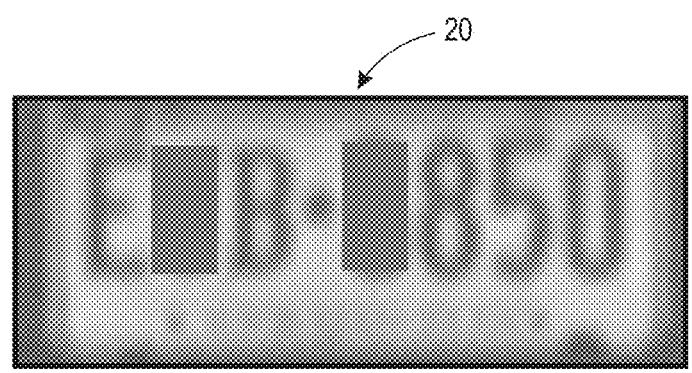
FIG. 2 illustrates sample tolling image exhibiting excessive blur.

FIG. 1 illustrates a sample tolling image 10 with a dominant license plate frame. FIG. 2 illustrates a sample tolling image 20 exhibiting excessive blur. One of the key challenges in implementing an efficient ALPR system is that many of the key features outside of a character sequence are often either partially obstructed (e.g., see FIG. 1) or are too blurry and/or offer too low resolution (e.g., see FIG. 2) to be useful. As a result, the plate characters themselves tend to be a predominant source of information used to identify the most likely issuing state for a given license plate.

One technique for estimating the issuing state associated with a license plate is to leverage the layout and sequence of characters on the license plate (sometimes referred to as the "syntax" information). For example, the standard passenger car license plate in New York is three letters followed by four numbers (LLL-NNNN). Further, the first letter on NY plates is currently only allowed to be "A" through "G". Other states in the New York region also use this same three letter, four number layouts. However, they typically have different valid sequences, in particular the valid set of starting characters are different. For instance, New Jersey plates have starting characters near the end of the alphabet. Likewise, Pennsylvania plates have starting characters in the "F", "G", and "H" range.

Thus, leveraging this layout and valid sequence information enables an ALPR system to resolve much of the ambiguity and to accurately identify the issuing state for a plate. Note, however, that there is still some degree of overlap in the valid sequence ranges across neighboring states. For example, both NY and PA can have LLL-NNNN plates that begin with "F" or "G". Based on prior probabilities of occurrence for these two states in a given deployment, a reasonable accuracy can still be achieved. There remains, however, an opportunity to leverage additional information to improve state identification, and therefore the overall ALPR system accuracy.

Figure 3:
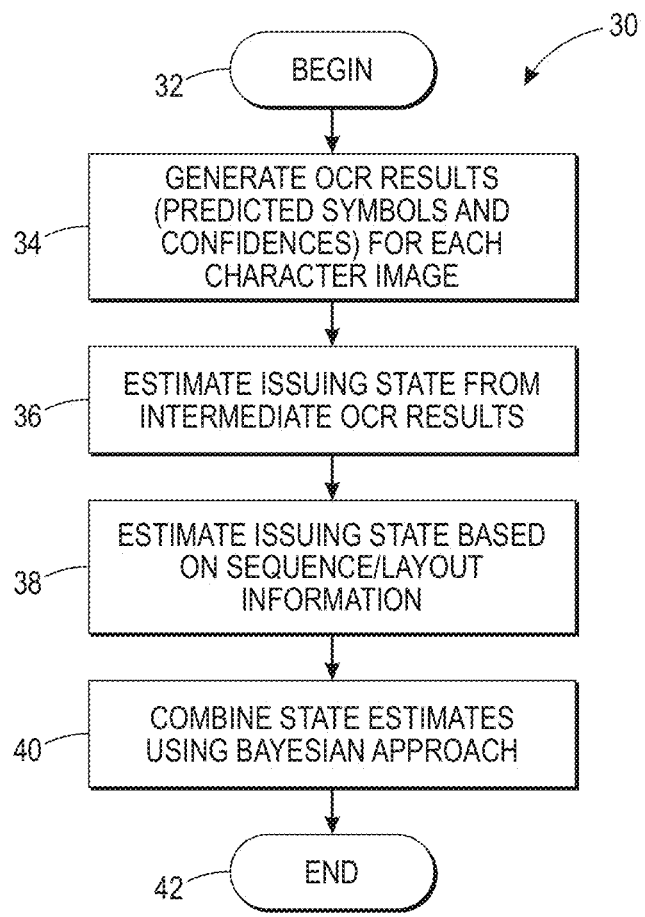
FIG. 3 illustrates a high-level flow chart of operations depicting logical operational steps of a method for determining the state/jurisdiction of a license plate, in accordance with a preferred embodiment.

FIG. 3 illustrates a high-level flow chart of operations depicting logical operational steps of a method 30 for determining the state/jurisdiction of a license plate, in accordance with a preferred embodiment. In order to improve the accuracy of the state identification process, the disclosed embodiments provide two basic functions. First, an estimate of the issuing state can be derived as part of the character recognition processing. To obtain a more robust estimate of the state, this OCR-based result can then be combined with the syntax (or layout) based result using a Bayesian approach.

Thus, as indicated at block 32, the process begins. Next, as depicted at block 34, a step or logical operation can be implemented to generate OCR results (predicted symbols and confidences) for each character image captured from a license place via an ALPR system/engine. As shown thereafter at block 36, a step or logical operation can be implemented for estimating issuing state data from intermediate OCR results. Next, as illustrated at block 38, a step or logical operation can be implemented for estimating the issuing state of the license plate based on sequence/layout information. Then, as shown at block 40, a step or logical operation can be implemented for combining state estimates using a Bayesian approach. The process of method 30 can then terminate as depicted at block 42.

Figure 4:
FIG. 4 illustrates examples of license plates exhibiting font differences across varying states.

FIG. 4 illustrates examples of license plates 44 including plates 43, 45, 47 exhibiting font differences across varying states. As mentioned previously, it is often a requirement that an ALPR system be accurate across the fonts for several different states. In particular, this tends to be a stress for the OCR subsystem since the symbols to be recognized can vary pretty dramatically from one state to another. FIG. 4 thus shows several examples of this state-to-state variability in font.

Figure 5:
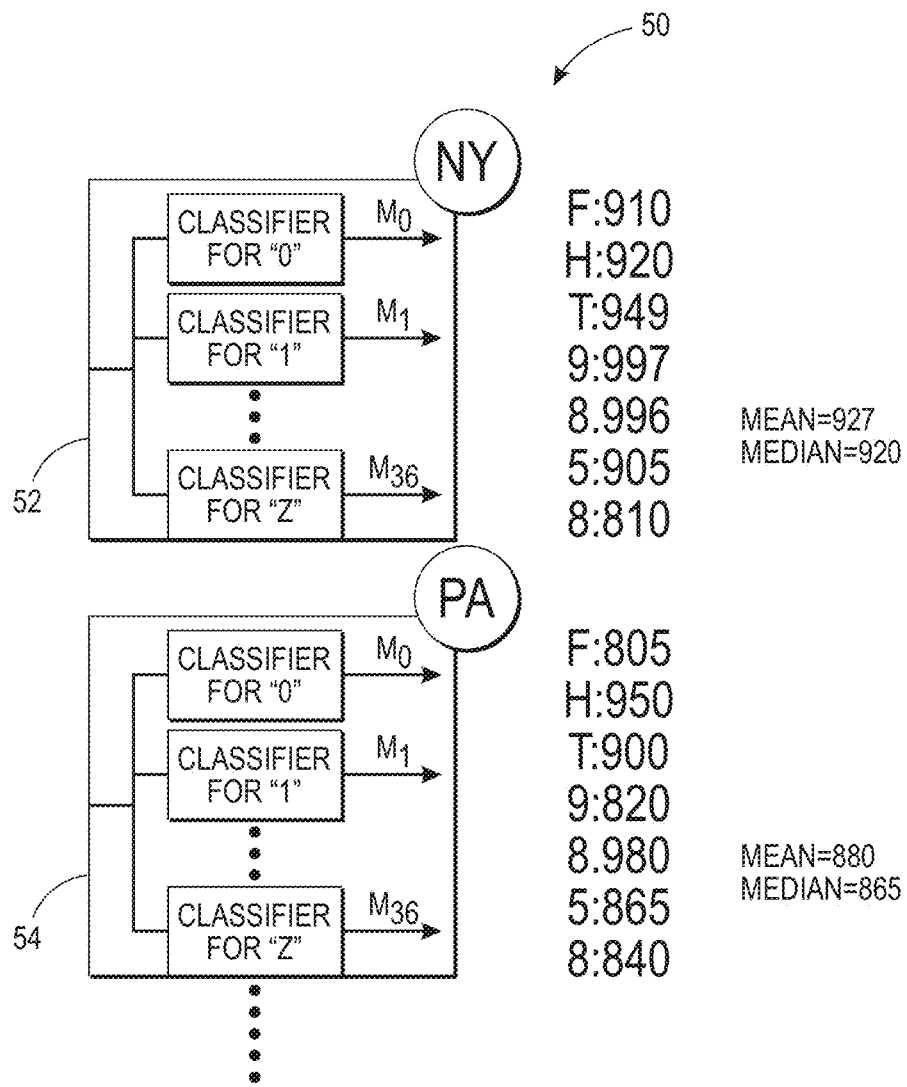
FIG. 5 illustrates a schematic diagram of a multi-engine solution to font invariance in OCR, in accordance with one or more aspects of the disclosed embodiments.

FIG. 5 illustrates a schematic diagram of a multi-engine solution 50 to font invariance in OCR, in accordance with one or more aspects of the disclosed embodiments. A preferred method for building font invariance into the OCR process is to train separate OCR engines for each font of interest. These highly optimized OCR engines are then run sequentially for each test image as shown in FIG. 5. Note that here each separate OCR engine then provides an estimated result (symbol conclusion) and a confidence for each submitted character image as shown, for example, at blocks 52, 54, etc.

The disclosed embodiments can thus estimate the most likely state based on the confidence scores associated with each state specific OCR engine's conclusions. There are several methods for translating the raw scores into this conclusion of issuing state. An example approach would be to conclude the state whose OCR process has the highest mean confidence across the individual character images in the plate. For the example shown in FIG. 5, the conclusion would be NY since the mean confidence of 927 was the largest across the multiple OCR engines. In a preferred embodiment, the confidence scores associated with each individual character image can be compared across all of the state-specific OCR engines. For each character, the OCR engine with the highest confidence is noted; this is effectively considered a "vote" for this engine (state). The overall OCR-based estimate of the issuing state is then taken to be the state whose tuned OCR engine received the most votes across all of the character images for this license plate.

Figure 6:
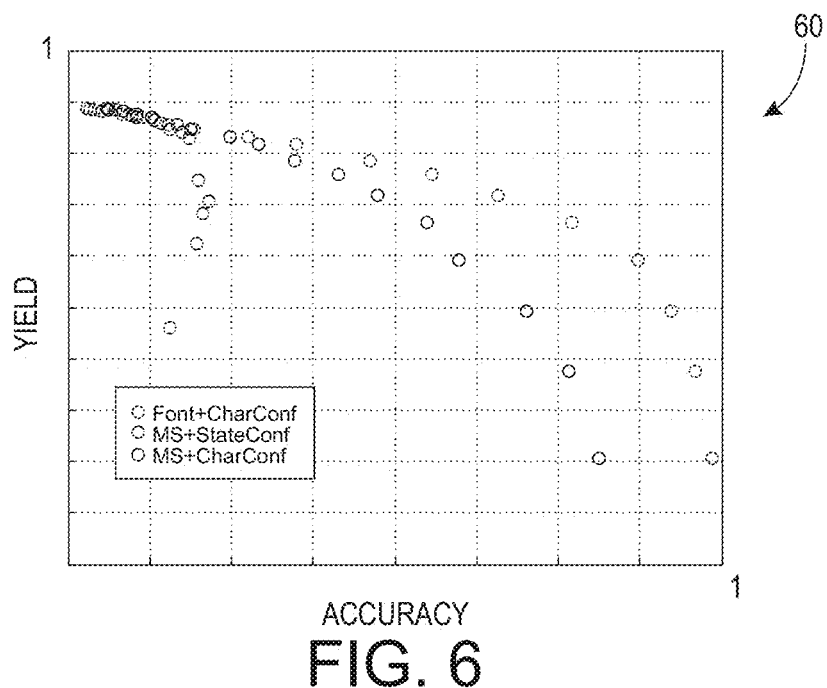
FIG. 6 illustrates a graph depicting data indicative of state identification performance comparison with respect to different identification methods.
Figure 7:
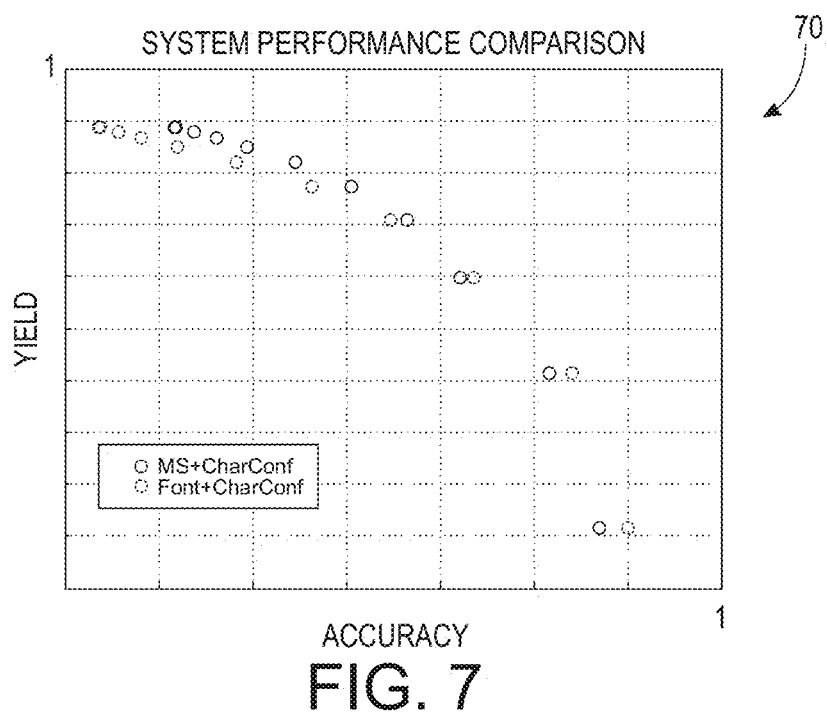
FIG. 7 illustrates a graph depicting data indicative of ALPR system performance comparison with respect to individual state identification methods.

Because each of the OCR engines is highly tuned for a specific state and the most obvious state-to-state difference in the plate characters is the font, the approach outlined above is intuitively thought to be leveraging font information to decide the state. As a result, this approach is often referred to as "font-based". A comparison of the state identification results obtained on a large sample of real tolling images for both the syntax-based and font-based approaches is shown in graph 60 of FIG. 6. In FIG. 6, the syntax-based results are labeled "MSC". The results indicate that when the two methods are evaluated individually, the font-based approach is slightly advantaged. If these individual methods for determining the issuing state are folded into a full ALPR system and tested as part of the overall analysis, roughly equivalent performance (at the system level) is achieved when the methods are compared one to the other (see graph 70 of FIG. 7).

Rather than choosing one or the other of the syntax or "font-based" methods for determining the issuing state of a license plate, the current invention leverages a Bayesian approach for merging the two "observations" into a single conclusion. The basic idea is represented in the Bayesian network 80 shown in FIG. 8. Not only does the Bayesian method provide a convenient framework for merging multiple pieces of evidence to draw a conclusion, it also provides a natural confidence measure, the posterior probability, associated with this conclusion. This is extremely beneficial since most ALPR systems allow for the use of a confidence threshold to enable trading off yield for accuracy.

Figure 8:
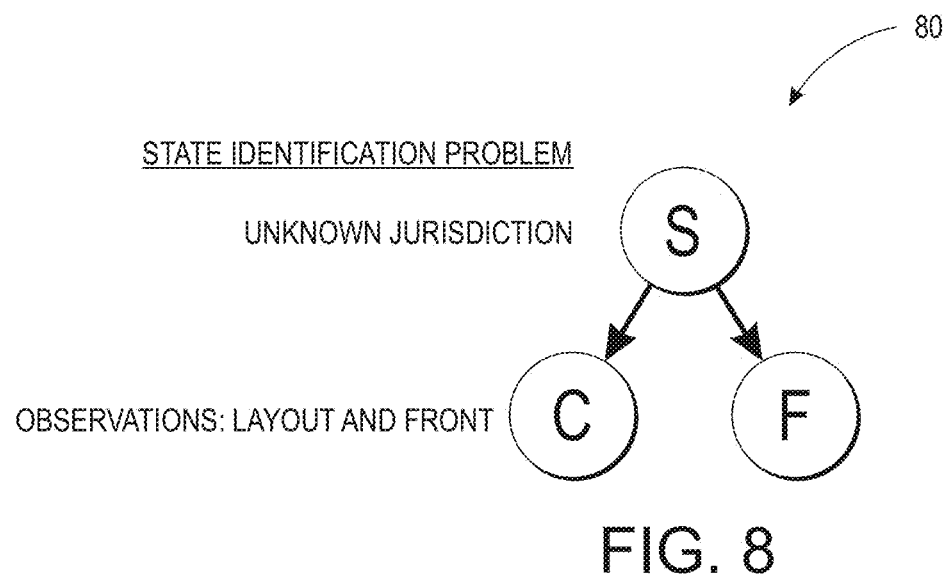
FIG. 8 illustrates a schematic diagram of a Bayesian network for state identification, which can be adapted for use in accordance with one or more aspects of the disclosed embodiments.

As shown in FIG. 8, the issuing state determines both the layout of the plate (the character sequence) and the font, labeled "C" and "F", respectively. For the purposes of this invention, one would like to take the given multiple observations or "pieces of evidence", in this case the estimate of the true font obtained from OCR and the plate layout/sequence, and then estimate the issuing state that most likely led to those observations. The posterior probability of a given issuing state "S" can be written as shown in Equation (1) below:

$$P(S \mid C, F) = \frac{P(C \mid S, F)P(S, F)}{P(C, F)}$$

$$= \frac{P(C \mid S)P(S, F)}{P(C, F)}$$

$$= \frac{P(S, C)P(S, F)}{P(C, F)P(S)}$$

$$= \frac{P(C, F \mid S)P(S)}{P(C, F)}$$

-continued
$$= \frac{P(C \mid S)P(F \mid S)P(S)}{P(C, F)}$$

$$= \frac{P(C, S)P(F, S)}{P(S)P(C, F)}$$

where:
P(S,C), P(S,F): relationships between source state and observations
P(C,F): joint probability of observations (font and layout)
P(S): prior probabilities for states In order to use this equation to predict the most likely issuing state for a given test example, there are several key pieces of information that are required. First, two relationships between source states and observations are needed. These provide information about how likely it is for each method to conclude a given label (estimated state) for a given actual source state. Intuitively, these are somewhat like probabilities of being correct or incorrect for each method individually. Second, the joint probability of the intermediate state conclusions can be derived via font and layout. Intuitively, this provides information about the level of agreement or disagreement between the results of the two methods. Third, prior probabilities for each state are needed. These provide information about how likely or unlikely a given state conclusion really is for an installation.

The prior probabilities are typically known (i.e. provided by the client or the business group based on measured road usage statistics) or can easily be learned via the ground truth labels typically required to train the rest of the ALPR system. The other two items require some additional learning steps within the training process. More specifically, after the standard OCR training process is completed a separate training data set is then used to derive the required probabilities for the Bayesian approach outlined in Equation (1) above. First, the individual state identification methods (e.g., font and syntax) can be applied, one leveraging the OCR confidence values and the other the OCR output character sequences. Coupled with the known ground truth state labels for the training set, the results of the individual methods can be used to derive the relationships discussed above. Taken together, the results of the individual methods can be used to derive the joint probability relationship. An example flowchart illustrating the sequence of operations of a process or method for deriving the required relationships and/or probabilities is depicted in FIG. 9.

Figure 9:
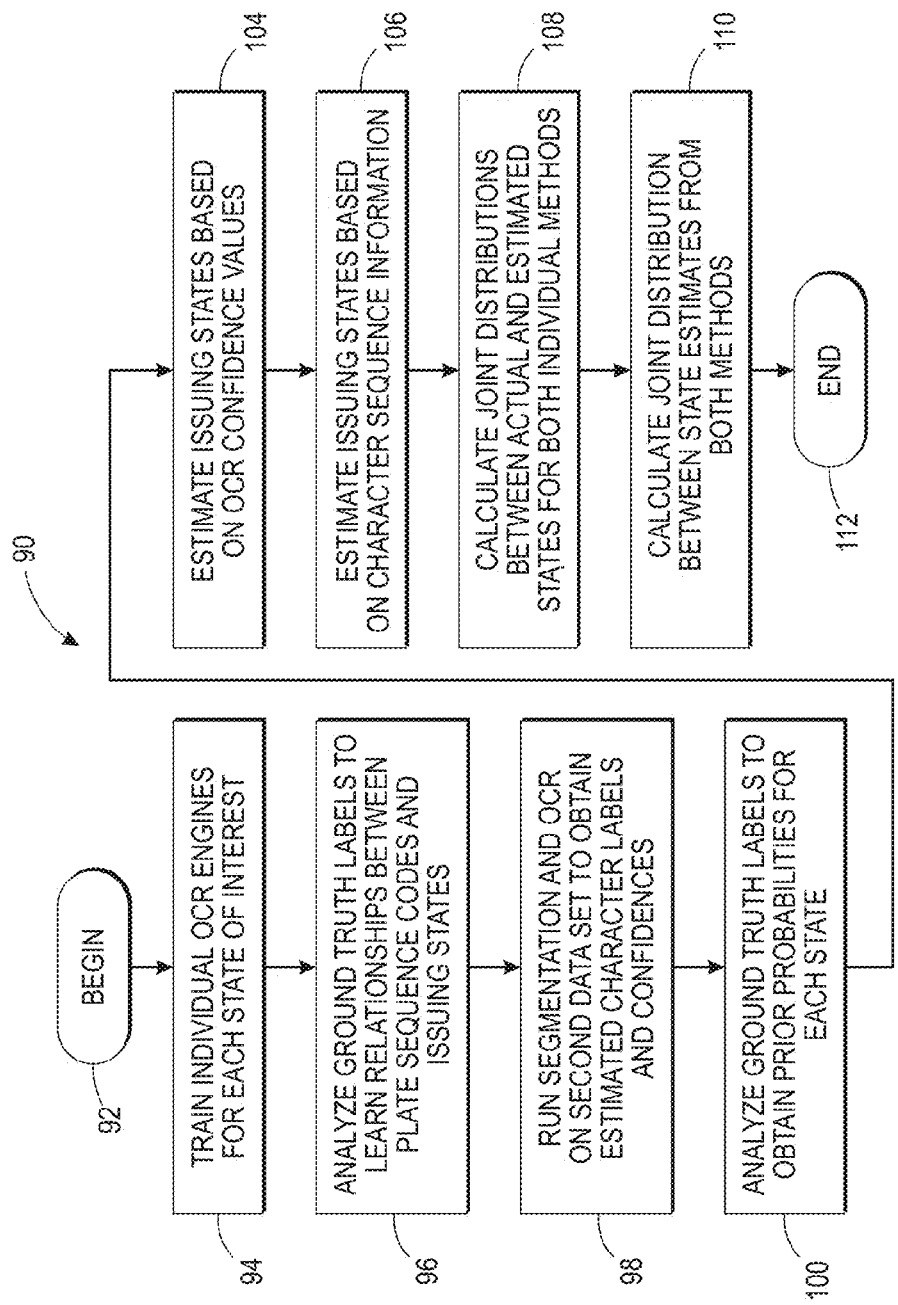
FIG. 9 illustrates a high-level flow chart of operations depicting logical operational steps for training a method for state identification, in accordance with a preferred embodiment.

FIG. 9 illustrates a high-level flow chart of operations depicting logical operational steps of a method 90 for training state identification, in accordance with a preferred embodiment. As illustrates at block 92, the process begins. Then, as indicated at block 94, a step or logical operation can be implemented to train individual OCR engines for each state of interest. Next, as described at block 96, a step or logical operation can be implemented to analyze ground truth labels to learn relationships between plate sequence codes and issuing states. Thereafter, as depicted at block 98, a step or logical operation can be implemented to run segmentation and OCR on a second data set to obtain estimated character labels and confidences. Next, as described at block 100, a step or logical operation can be implemented to analyze ground truth labels to obtain prior probabilities for each state. Then, as depicted at block 104, a step or logical operation can be implemented to estimate issuing states based on OCR confidence values. Following processing of the operation indicated at block 104, a step or logical operation can be implemented, as illustrated at block 106, to estimate issuing states based on character sequence information. Thereafter, as described at block 108, a step or logical operation can be implemented to calculate joint distributions between actual and estimated states for both individual methods. Then, as shown at block 110, a step or logical operation can be implemented to calculate the joint distribution between state estimates from both methods. The process can then end, as depicted at block 112.

Figure 10:
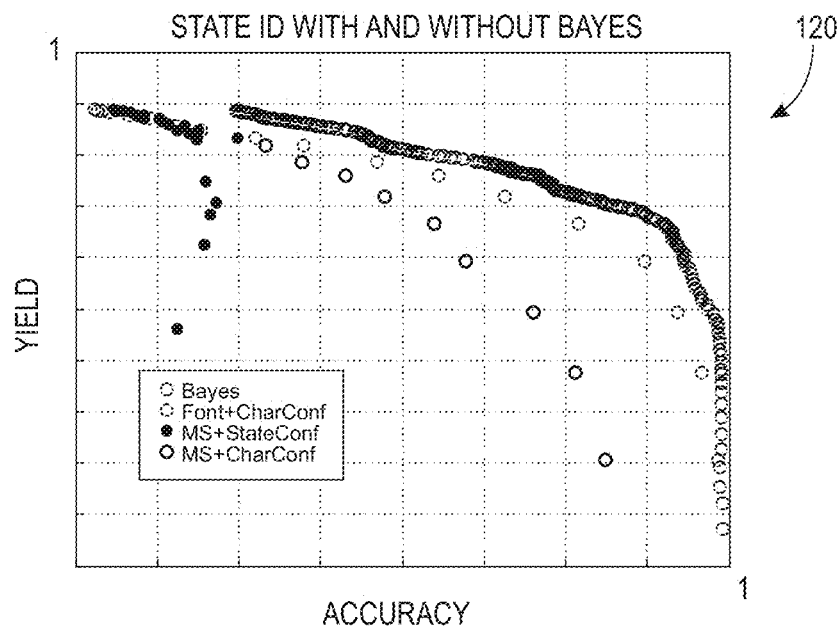
FIG. 10 illustrates a graph depicting data indicative of state identification performance comparison for all methods.
Figure 11:
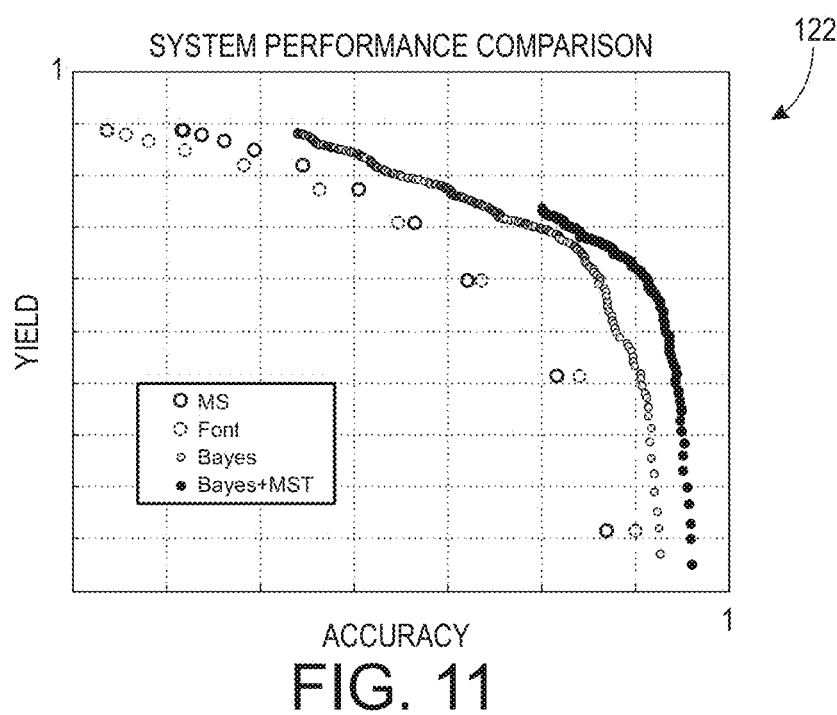
FIG. 11 illustrates a graph depicting data indicative of ALPR system level performance comparison for all methods.

A comparison of the results obtained for state identification using the individual font and layout methods, and the proposed Bayesian method, is provided in graph 120 of FIG. 10. A similar comparison of methods when applied within the overall XLPR system context is provided in graph 122 of FIG. 11. Both sets of results clearly indicate a significant performance benefit for the state identification method of the present invention: incorporating intermediate OCR information and leveraging jointly with syntax-based results.

Note that the methodology of the disclosed embodiments is in fact quite extensible. In particular, additional evidence of many different forms can be quite easily included in the Bayesian analysis. Embodiments have been attempted to implement a purely image-based approach to estimating the issuing state for a plate. This work has shown promise and could easily be folded into the proposed framework to improve the overall accuracy of the state conclusion. This actually highlights the ability of the proposed method/system to incorporate information from multiple modalities (e.g., text plate strings, OCR confidence values, image patches, etc.) to determine the overall state conclusion.

Figure 12:
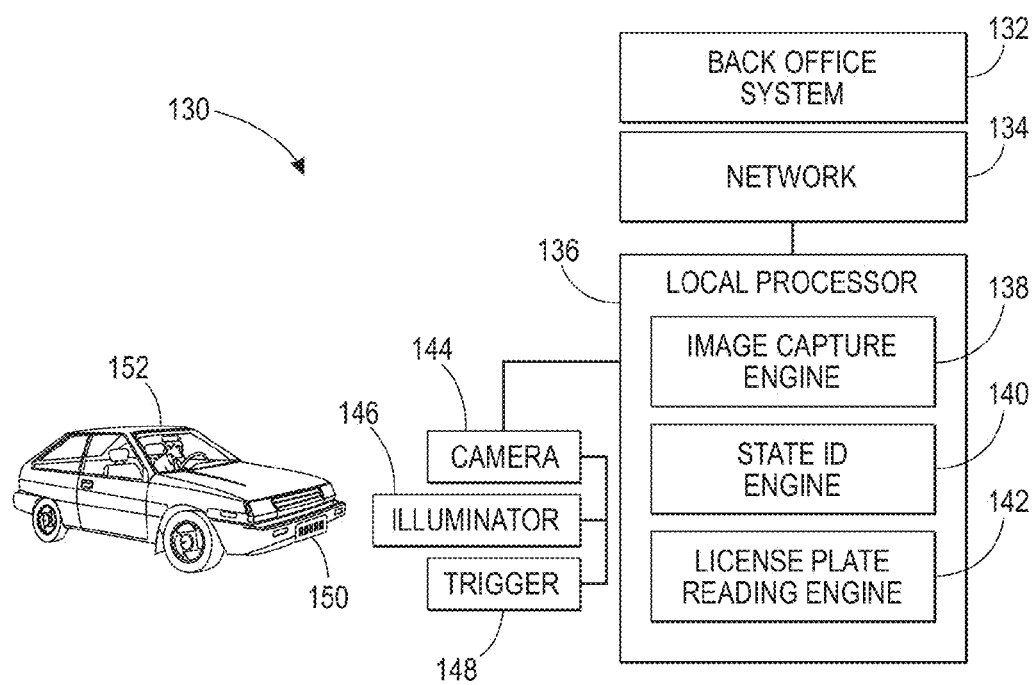
FIG. 12 illustrates a high-level block diagram of an ALPR system for identifying the issuing state of license plate, which can be implemented in accordance with an alternative embodiment.

FIG. 12 illustrates a high-level system diagram of an ALPR system 130 that can be adapted for use in accordance with the disclosed embodiments. The system 130 depicted in FIG. 12 generally includes or can be used with a vehicle 152 with a license plate 150. System 130 includes a trigger 148, a camera 144, and an illuminator 146 for capturing an image. System 130 further includes a local processor 136 that includes an image capture engine 138, a license plate state identification engine 140, and a license plate reading engine 142. System 130 can further include a network 134 (e.g., a local wireless network, the Internet, cellular communications network, other data network, etc.), and a back office system 132 for processing transactions and managing patron accounts. The local processor 136 can communicate with the back office system 132 via the network 134.

In FIG. 12, the license plate 150 is depicted located on the front of the vehicle 152, but the license plate 150 could also be located on the rear of the vehicle 152, as well. Some states (e.g., Texas) require license plates in both places (i.e., at the rear and front of a vehicle). In one scenario, the vehicle 152 enters a license plate reading zone, which can contain a trigger device 148 that controls an illuminator 146, which illuminates the license plate region of the vehicle 152, and a camera 144 that captures images of the license plate 150 on the vehicle 152. The camera 144 can be connected to and/or communicate with the local processor unit 136.

The image capture engine 138 controls the trigger 148, illuminator 146, and camera 144 in order to properly image the vehicle 152 and the license plate 150. The state license plate identification engine 140 estimates/identifies the state/jurisdiction associated with the license plate 150 according to one or more of the various methods/systems and steps or logical operations described herein (e.g., see FIGS. 3, 5, 8, 9). Engine 140 thus calculates state identification/jurisdiction data. The license plate 150 and state jurisdiction data can then be sent by the local processor 136 over the network 134 to the back office system 132. The back office system 132 can process the license plate and state jurisdiction data and can assess a toll or otherwise interact with a patron account or takes other transportation application specific actions.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module" or "engine". For example, an "engine" as discussed may be a software module. Examples of such engines and/or modules include the image capture engine 138, state identification engine 140, and license plate reading engine 142 shown in FIG. 12.

Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions, modules, etc., shown with respect to FIGS. 3, 5, 8, 9, and 12.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 13:
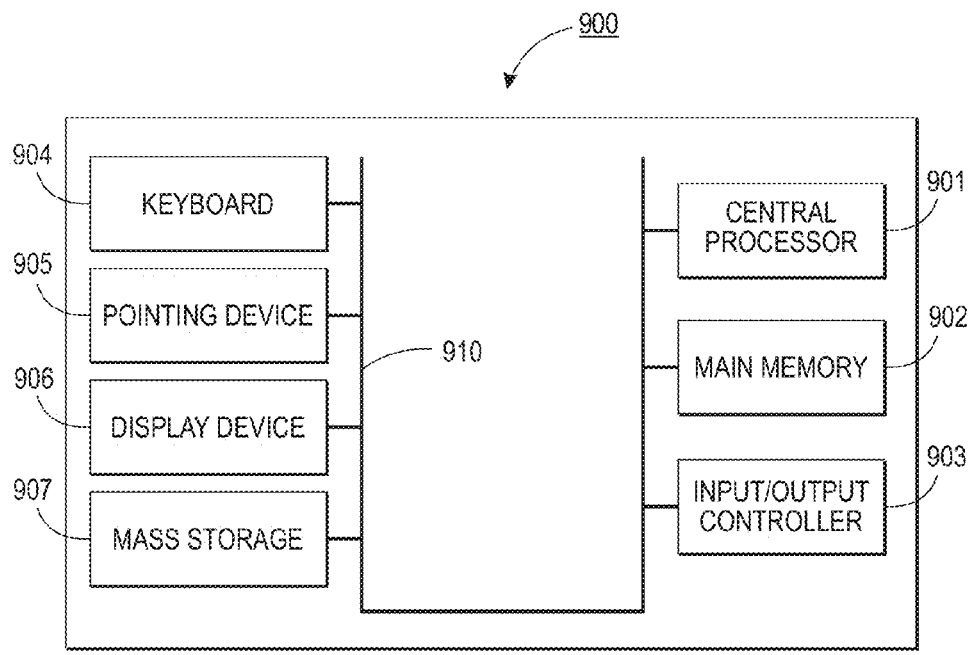
FIG. 13 illustrates a schematic view of a computer system, which can be implemented in accordance with one or more of the disclosed embodiments.
Figure 14:
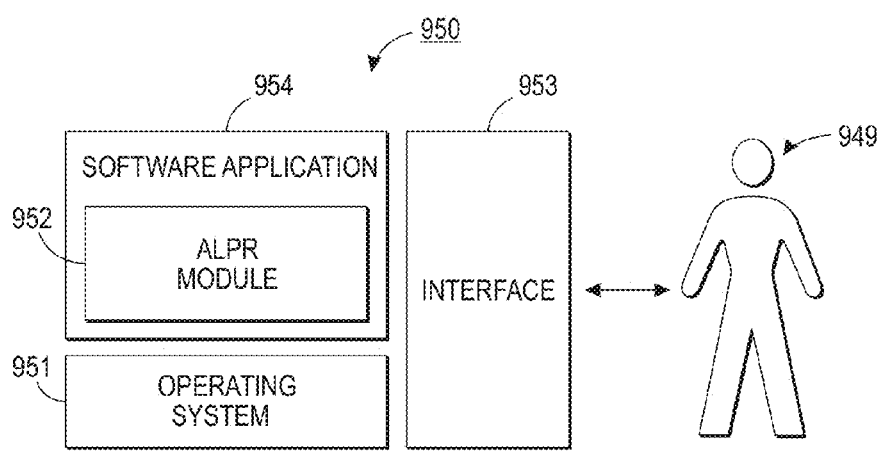
FIG. 14 illustrates a schematic view of a software system including an ALPR module using augmented data, an operating system, and a user interface, in accordance with the disclosed embodiments.

FIGS. 13-14 are provided as exemplary diagrams of data-processing environments in which embodiments of the present invention may be implemented. It should be appreciated that FIG. 13-14 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 13, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device such as a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

It can be appreciated that in some embodiments, the processor 901 may process instructions from, for example, the image capture engine 138, the license plate state identification engine 140, and the license plate reading engine 142 shown in FIG. 12, and that in fact, the data-processing system 900 may function as the local processor 136, or, for example, the back office system 132 shown in FIG. 12 and further can communicate with, for example, the camera 144, the illuminator 146, the trigger 148, and so forth, as shown as the example ALPR system 130 depicted in FIG. 12.

FIG. 14 illustrates a computer software system 950, which may be employed for directing the operation of the data-processing system 900 depicted in FIG. 13. Software application 954, stored in main memory 902 and on mass storage 907, generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 14, module 952 can be implemented as, for example, a module that performs the logical instructions or operations depicted in FIGS. 3, 5, 8, 9, and 12, or other appropriate methods/processes.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 952) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 951 and interface 953. The software application 954 can include, for example, an ALPR module 952, which can include instructions for carrying out various steps, logical operations, and/or modules such as those shown in FIGS. 3, 5, 8, 9, and 12, and for estimating the likely state associated with a license plate captured by an ALPR system (e.g., system 130 of FIG. 12).

FIGS. 13-14 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that the disclosed embodiments leverage intermediate knowledge gained within an Optical Character Recognition (OCR) step (i.e., confidence scores associated with each state specific OCR engine's conclusion) to provide an estimate of the likely issuing state of a license plate. In addition, such embodiments use a Bayesian approach to combine this OCR information with the state estimate obtained based on the syntax (e.g., layout and sequence of the characters on the plate) to determine an overall conclusion as to the issuing state. Benefits of the disclosed approach include a significant improvement of the yield (e.g., ~15%) in identifying the issuing state and therefore improvement of overall ALPR system performance, without requiring any image content It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for automatically determining the issuing state of a license plate, said method comprising:
processing via at least one optical character recognition engine, an image of a license plate acquired by an automatic license plate recognition engine, wherein each optical character recognition engine among said at least one optical character recognition engine is tuned to a particular state;
analyzing confidence data output from said at least one optical character recognition engine to estimate an issuing state associated with said license plate, said estimated issuing state and said confidence output comprising a font based observation from said at least one optical character recognition engine;
analyzing a syntax associated with said image of said license plate to estimate an issuing state associated with said license plate, said estimated issuing state comprising a syntax based observation; and
merging multiple observations comprising said font based observation and said syntax based observation related to said issuing state to derive an overall conclusion and assign an associated confidence value with respect to said confidence data and determine a likely issuing state associated with said license plate.

2. The method of claim 1 further comprising merging said multiple observations using a Bayesian-based approach.

3. The method of claim 1 further comprising estimating said likely issuing state based on intermediate confidence data output from said at least one optical character recognition engine.

4. The method of claim 1 further comprising estimating said likely issuing state based on character sequence data derived from said image of said license plate and output from said at least one optical character recognition engine.

5. The method of claim 1 further comprising calculating at least one joint distribution between actual states and estimated states associated with said license plate to further estimate said issuing state.

6. The method of claim 1 further comprising calculating at least one joint distribution between estimates of said issuing state to further estimate said issuing state.

7. The method of claim 1 further comprising analyzing ground truth labels to obtain prior probability data associated with likely issuing states associated with said license plate and assist in estimating said issuing state.

8. A system for automatically determining the issuing state of a license plate, said system comprising:
a processor;
a data bus coupled to said processor; and
a computer-usable medium embodying computer program code, said computer-usable medium being coupled to said data bus, said computer program code comprising instructions executable by said processor and configured for:
processing via at least one optical character recognition engine, an image of a license plate acquired by an automatic license plate recognition engine, wherein each optical character recognition engine among said at least one optical character recognition engine is tuned to a particular state;
analyzing confidence data output from said at least one optical character recognition engine to estimate an issuing state associated with said license plate, said estimated issuing state and said confidence output comprising a font based observation from said at least one optical character recognition engine;
analyzing a syntax associated with said image of said license plate to estimate an issuing state associated with said license plate, said estimated issuing state comprising a syntax based observation; and
merging multiple observations comprising said font based observation and said syntax based observation related to said issuing state to derive an overall conclusion and assign an associated confidence value with respect to said confidence data and determine a likely issuing state associated with said license plate.

9. The system of claim 8 wherein said instructions are further configured for merging said multiple observations using a Bayesian-based approach.

10. The system of claim 8 wherein said instructions are further configured for estimating said likely issuing state based on intermediate confidence data output from said at least one optical character recognition engine.

11. The system of claim 8 wherein said instructions are further configured for estimating said likely issuing state based on character sequence data derived from said image of said license plate and output from said at least one optical character recognition engine.

12. The system of claim 8 wherein said instructions are further configured for calculating at least one joint distribution between actual states and estimated states associated with said license plate to further estimate said issuing state.

13. The system of claim 8 wherein said instructions are further configured for calculating at least one joint distribution between estimates of said issuing state to further estimate said issuing state.

14. The system of claim 8 wherein said instructions are further configured for analyzing ground truth labels to obtain prior probability data associated with likely issuing states associated with said license plate and assist in estimating said issuing state.

15. A non-transitory processor-readable medium storing computer code representing instructions to cause a process for automatically determining the issuing state of a license plate, said computer code further comprising code to:
process via at least one optical character recognition engine, an image of a license plate acquired by an automatic license plate recognition engine, wherein each optical character recognition engine among said at least one optical character recognition engine is tuned to a particular state;
analyze confidence data output from said at least one optical character recognition engine to estimate an issuing state associated with said license plate, said estimated issuing state and said confidence output comprising a font based observation from said at least one optical character recognition engine;
analyze a syntax associated with said image of said license plate to estimate an issuing state associated with said license plate, said estimated issuing state comprising a syntax based observation; and
merge multiple observations comprising said font based observation and said syntax based observation related to said issuing state to derive an overall conclusion and assign an associated confidence value with respect to said confidence data and determine a likely issuing state associated with said license plate.

16. The non-transitory processor-readable medium of claim 15 wherein said code further comprises code to merge said multiple observations using a Bayesian-based approach.

17. The non-transitory processor-readable medium of claim 15 wherein said code further comprises code to estimate said likely issuing state based on intermediate confidence data output from said at least one optical character recognition engine.

18. The non-transitory processor-readable medium of claim 15 wherein said code further comprises code to estimate said likely issuing state based on character sequence data derived from said image of said license plate and output from said at least one optical character recognition engine.

19. The non-transitory processor-readable medium of claim 15 wherein said code further comprises code to calculate at least one joint distribution between actual states and estimated states associated with said license plate to further estimate said issuing state.

20. The non-transitory processor-readable medium of claim 15 wherein said code further comprises code to:
   calculate at least one joint distribution between estimates of said issuing state to further estimate said issuing state; and
   analyze ground truth labels to obtain prior probability data associated with likely issuing states associated with said license plate and assist in estimating said issuing state.

* * * * *